(12) United States Patent
Jain et al.

(10) Patent No.: US 8,806,287 B1
(45) Date of Patent: Aug. 12, 2014

(54) RETRANSMISSION SYSTEMS AND METHODS IN RELIABLE STREAMING PROTOCOLS USING CONNECTION CHARACTERISTICS

(75) Inventors: Arvind Jain, Sunnyvale, CA (US); Yuchung Cheng, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 379 days.

(21) Appl. No.: 12/889,736

(22) Filed: Sep. 24, 2010

(51) Int. Cl.
- *H03M 13/00* (2006.01)
- *G08C 25/02* (2006.01)
- *H04L 1/18* (2006.01)
- *H04L 1/14* (2006.01)

(52) U.S. Cl.
USPC ........... 714/748; 714/749; 714/750; 714/751; 714/774

(58) Field of Classification Search
USPC ......................................... 714/748–751, 774
See application file for complete search history.

(56) References Cited

U.S. PATENT DOCUMENTS

| | | | | |
|---|---|---|---|---|
| 4,422,171 A | * | 12/1983 | Wortley et al. | 714/748 |
| 4,726,027 A | * | 2/1988 | Nakamura et al. | 714/748 |
| 5,764,699 A | * | 6/1998 | Needham et al. | 375/261 |
| 5,768,527 A | * | 6/1998 | Zhu et al. | 709/231 |
| 5,809,512 A | * | 9/1998 | Kato | 715/207 |
| 5,828,677 A | * | 10/1998 | Sayeed et al. | 714/774 |
| 6,085,252 A | * | 7/2000 | Zhu et al. | 709/231 |
| 6,574,668 B1 | * | 6/2003 | Gubbi et al. | 709/237 |
| 7,155,655 B2 | * | 12/2006 | Cheng | 714/748 |
| 7,418,596 B1 | * | 8/2008 | Carroll et al. | 713/169 |
| 7,693,032 B2 | * | 4/2010 | Li et al. | 370/204 |
| 7,693,058 B2 | * | 4/2010 | Cheung et al. | 370/231 |
| 8,121,211 B2 | * | 2/2012 | Lou et al. | 375/267 |
| 8,194,588 B2 | * | 6/2012 | Park et al. | 370/328 |
| 8,265,171 B2 | * | 9/2012 | Steinbach et al. | 375/240.27 |
| 2004/0030790 A1 | | 2/2004 | Le et al. | 709/230 |
| 2006/0240859 A1 | * | 10/2006 | Gervais et al. | 455/522 |
| 2008/0177884 A1 | * | 7/2008 | Agarwal | 709/227 |

\* cited by examiner

*Primary Examiner* — Joseph D Torres
(74) *Attorney, Agent, or Firm* — Sterne, Kessler, Goldstein & Fox P.L.L.C.

(57) ABSTRACT

Systems, methods and articles of manufacture for retransmission of data in streaming protocols are described herein. Embodiments enable efficient retransmission of dropped packet data in guaranteed delivery or request-response data transfer protocols such as TCP. In particular, embodiments provide efficient retransmission of dropped packet data based on the short and/or long term historical reliability of the underlying client connection. An embodiment includes maintaining, for one or more clients in a client-server architecture, data representing connection characteristics for one or more client-server connections. Based on collected short-term and long-term client connection characteristics, an efficient data packet retransmission scheme is determined to optimize use of the connection for retransmitting dropped packet data.

17 Claims, 6 Drawing Sheets

RETRANSMISSION SYSTEMS AND METHODS IN RELIABLE STREAMING PROTOCOLS USING CONNECTION CHARACTERISTICS

FIELD

Embodiments described herein generally relate to efficient retransmission of dropped packet data in streaming protocols based on short term and long term client connection characteristics.

BACKGROUND

In a computer network employing a reliable streaming protocol for data communication, also known as guaranteed delivery streaming protocols, data that is not successfully transmitted from one computer to another over a network must be retransmitted. Often this retransmission, however, is not performed in an optimal fashion. The sender must determine when to retransmit data in a way that uses network resources efficiently. If the sender retransmits data too aggressively, it will be placing more data packets onto the network than necessary, which may hurt network performance. Alternatively, if the sender retransmits data too conservatively, it may not take advantage of available network resources, and the receiver may wait unnecessarily.

Currently, retransmission schemes use heuristics to balance these tradeoffs, however, these schemes use a one-size-fits-all approach. As a result, inefficiencies arise that vary from connection to connection.

BRIEF SUMMARY

Disclosed herein are systems and methods for efficient retransmission of dropped packet data in streaming protocols based on stored and measured connection characteristics. In one embodiment, for one or more clients in a client-server architecture, short term and long term client-server connection characteristics are maintained at the server. These connection characteristics are used to determine the most efficient scheme for retransmitting dropped packet data over the client-server connection.

Further embodiments, features, and advantages, as well as the structure and operation of the various embodiments, are described in detail below with reference to the accompanying drawings.

BRIEF DESCRIPTION OF THE DRAWINGS/FIGURES

Embodiments are described with reference to the accompanying drawings. In the drawings, like reference numbers may indicate identical or functionally similar elements. These figures are intended to be illustrative, not limiting.

DETAILED DESCRIPTION

In the Detailed Description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Overview

Figure 1:
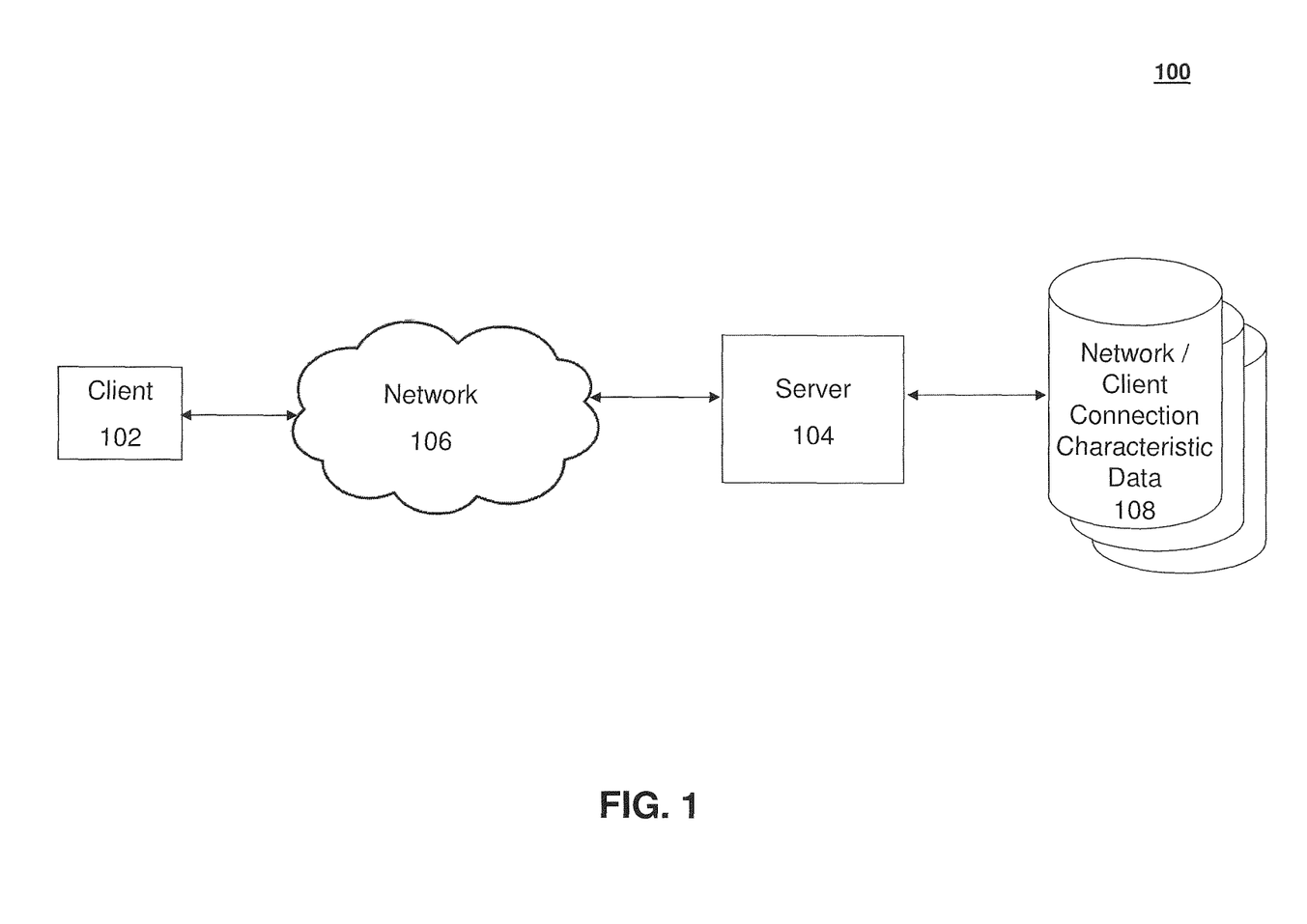
FIG. 1 illustrates a system having a client and a server, according to an embodiment.

FIG. 1 illustrates a client-server network architecture according to an embodiment. One or more clients 102 connect to a server 104 over a network 106. The server 104 is connected to one or more data repositories such as a database 108 configured to maintain data representing network and client connection characteristics. The data repositories may be housed within the server 104 or separately.

Client 102 and server 104 are in data communication over network 106 using a reliable streaming protocol such as the Transmission Control Protocol (TCP). Reliable streaming protocols are also known as guaranteed delivery protocols or connection-oriented protocols, where "reliable" and "guaranteed delivery" refer to the nature of the protocol to ensure data delivery. Reliable streaming protocols provide reliable, ordered delivery of a stream of bytes from one computer to another computer. Such protocols are "connection-oriented" in that handshaking is required to establish communication between, for example, client 102 and server 104. Reliable streaming protocols ensure data delivery by managing message transmission and acknowledgment, dropped data packet retransmission, and delivery timeout, among other things. Reliable streaming protocols can be contrasted with "simple" or "connectionless" transmission protocols that do not provide reliable delivery of data packets. One such example of a connectionless protocol is the User Datagram Protocol (UDP). In the UDP, there will be no indication whether a data packet sent to a recipient is lost during transmission.

Embodiments herein are described with reference to TCP as an exemplary reliable streaming protocol; however, it is within the knowledge of one skilled in the art to identify other suitable reliable streaming protocols that are within the scope of the Detailed Description provided herein.

Once a connection has been established using a reliable streaming protocol such as TCP, data messages are transmitted over network 106 from, for example, server 104 to client 102. These data messages are often made up of one or more units of data, sometimes referred to as data segments or data packets. Delivery of these data messages using TCP generally requires each individual data packet in the data message to be transmitted reliably across network 106 and reassembled by the recipient, according to the protocol, in the correct order and without any loss of data packets.

Because data transmission is inherently not reliable, meaning loss of data packets during transmission can and often does occur, TCP employs a positive acknowledgment with retransmission scheme to guarantee delivery of the data packets that make up a data message. Positive acknowledgement with retransmission requires the recipient to respond to the sender with an acknowledgment message as it receives each data packet. For each data packet sent, the sender maintains a record, including the time sent, and waits for the acknowledgment from the recipient. Delivery timeout may occur when the elapsed time since a data packet was initially sent has exceeded some threshold limit without receipt of an acknowledgment from the recipient. In that case, the sender may assume the data packet has been lost and can retransmit the data packet. Once the recipient receives the missing data packet, it will send back an acknowledgement to the sender indicating the data packet has been received. The sender will then update its record for that data packet to indicate that the packet was successfully transmitted.

Because reliable streaming protocols are optimized for guaranteed and accurate delivery, as opposed to speedy delivery, these protocols sometimes incur relatively long delays while waiting for retransmission of lost data packets. As a result, these protocols are often rejected for use in real-time or other time-sensitive applications.

Part of this delay incurred, however, can result from inefficient retransmission of data packets. Traditionally, for example, server 104 determines when to retransmit data to a particular client 102 based on a universal threshold time limit which governs the retransmission scheme with respect to all clients 102 that connect to server 104. The quality and reliability of a client-server connection, however, can vary from client to client, and this one-size-fits-all approach to data packet retransmission can result in inefficiencies across client connections. For example, for a given client-server connection, if server 104 retransmits dropped packet data too aggressively in view of the quality and reliability of the particular connection, server 104 will be placing more data packets onto network 106 than necessary, which may hurt network performance. On the other hand, if server 104 retransmits data too conservatively in view of the particular connection characteristics, it may not take advantage of available network resources, and the recipient may be waiting for retransmission unnecessarily.

Whether a particular retransmission scheme is considered too aggressive or too conservative is relative to the quality and reliability of the underlying connection. A retransmission scheme that is considered too aggressive for a slow and unreliable connection may be considered too conservative for a connection that is fast and highly reliable. A retransmission scheme that is tailored to the individual client-server connection, therefore, is desirable. Such tailoring can be accomplished by collecting connection characteristics for clients over time each time that client connects to the server. This past connection characteristics data can be assessed along with presently measured connection characteristics data to determine the most efficient retransmission scheme for a particular client during the present connection.

In an embodiment, an exemplary server 104 maintains for one or more clients 102 one or more connection characteristics relating to the reliability and quality of the underlying client-server connection in database 108. Rather than employing a retransmission scheme that does not make efficient use of the individual client-server connections, as in a universal or one-size-fits-all scheme, server 104 draws upon the connection characteristics stored in database 108 to determine the most efficient retransmission scheme for a given client.

Database 108 can be implemented in any form of hardware storage device (e.g., hard disk, tape storage, etc.) or can be a workstation, computer, cluster of computers, set-top box, or other device having at least one processor. In an embodiment, and as shown in FIG. 1, database 108 may be located separately from server 104. In another non-limiting embodiment, database 108 may be connected to a wired and/or wireless network (not shown) that enables server 104 to communicate with database 108 across the network.

Connection Characteristics Data

The data describing the connection characteristics of an underlying client-server connection can be long term data or short term data. Long term data can be, for example, historical or previous connection characteristics data and short term data can be, for example, current or immediate past connection characteristics data. Long term data may be data measured and collected over time and during multiple connections between a server and a given client. Long term connection characteristics data generally describes the historical reliability and quality of the underlying client connection over time, and can be stored in a database. Examples of long term connection characteristics are connection type, throughput or bandwidth, uptime, transmission speed, error rate, data packet loss rate, propagation delay of the connection, and other measurable client connection characteristics relevant to efficient transmission of data that will be apparent to one of skill in the art.

Short term connection characteristics data may be data describing the presently or recently measured reliability and quality of the underlying client connection. Short term connection characteristics data can be stored in the same database as the long term data, or in a separate database. As with long term connection characteristics data, examples of short term connection characteristics are connection type, throughput or bandwidth, uptime, transmission speed, error rate, data packet loss rate, propagation delay of the connection, and other measurable client connection characteristics relevant to efficient transmission of data that will be apparent to one of skill in the art. As opposed to long term connection characteristics data, however, short term connection characteristics are currently or recently measured during a present connection between the server and the given client. Short term connection characteristics data can be used in conjunction with long term connection characteristics data for use in developing an efficient retransmission scheme.

Connection Characteristics Data Collection

Figure 2:
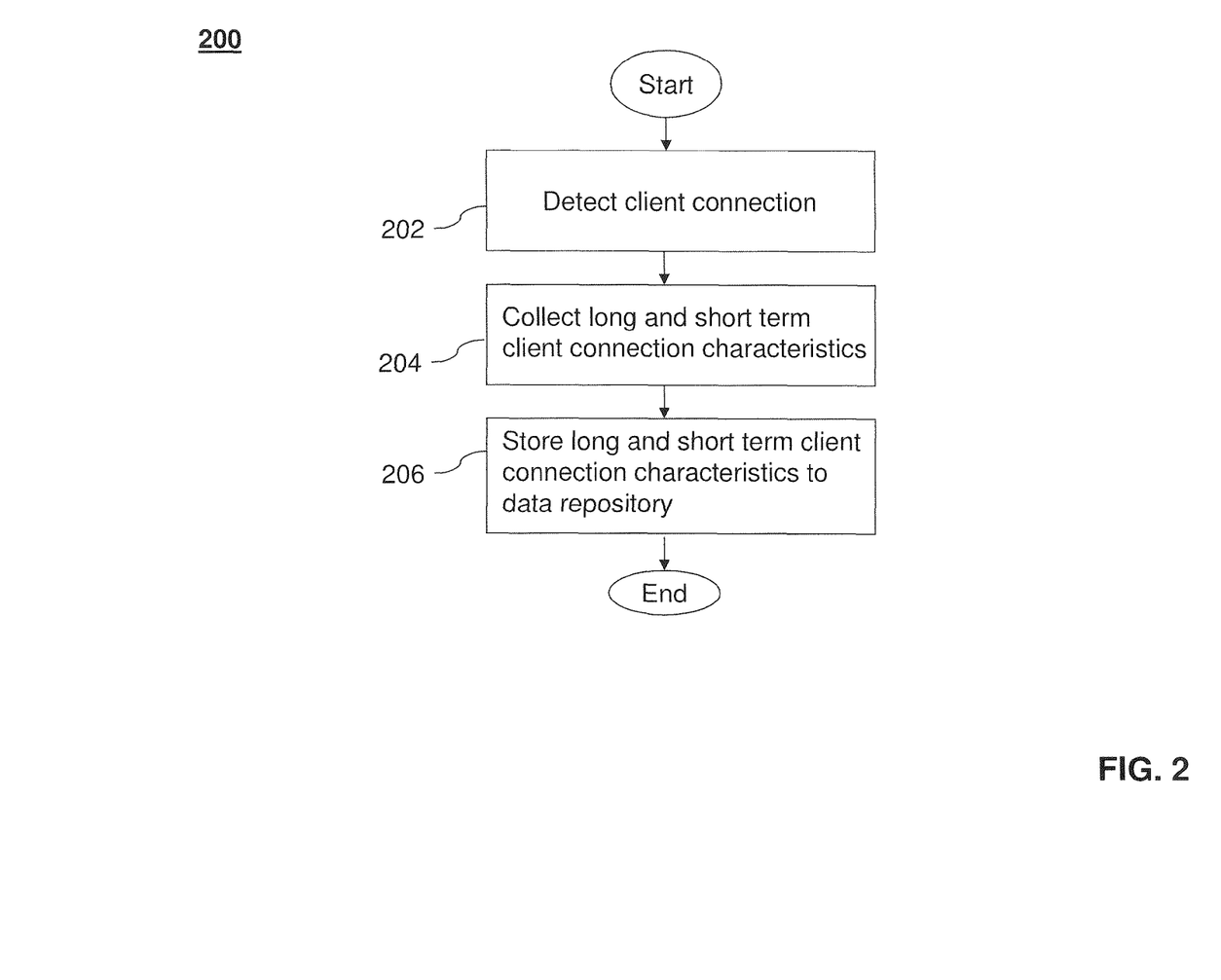
FIG. 2 is a flowchart illustrating an exemplary aspect of operation, according to an embodiment.

To assess connection characteristics for a particular client-server connection, data relating to connection characteristics must be collected. This data must be collected both over the long term (e.g. historical or previous connection characteristics data) and in the short term (e.g. current or immediate past connection characteristics data). FIG. 2 is a flow chart illustrating exemplary operations that may be performed during connection characteristics data collection. In 202, a new client connection is detected. In 204, the present connection characteristics data, such as connection type, throughput and error rate values, are detected for the connection. In 206, this data may be stored and made available for use in determining an efficient retransmission scheme, and also may be stored to a database, such as database 108, as a record of connection characteristics to be drawn upon at a later time as historical connection characteristics data.

Figure 3:
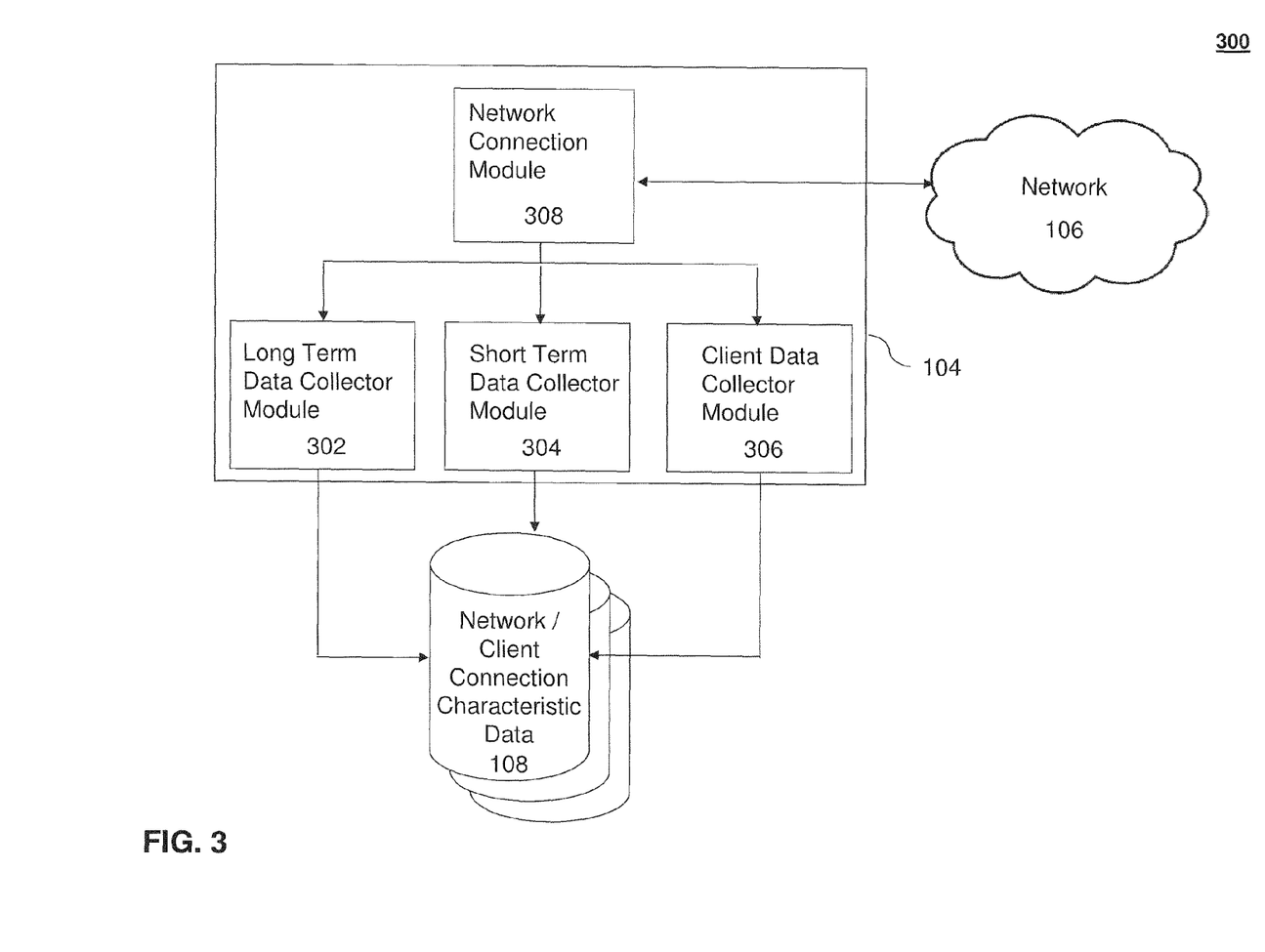
FIG. 3 illustrates a further system architecture, according to an embodiment.

Turning to FIG. 3, illustrated therein is an embodiment in which a long term data collector module 302 and a short term data collector module 304 are connected to the network 106 via a network connection module 308. As referred to herein, a module may be any type of processing (or computing) device having one or more processors. For example, a module can be a workstation, mobile device, computer, cluster of computers, set-top box, or other device having at least one processor. In an embodiment, multiple modules may be implemented on the same processing device. Such a processing device may include software, firmware, hardware, or a combination thereof. Software may include one or more applications and an operating system. Hardware can include, but is not limited to, a processor, memory, and/or graphical user interface display.

The long term data collector module 302 and a short term data collector module 304 receive connection characteristics data describing the reliability and quality of a client connection and store this data in one or more databases 108. In some embodiments, client specific data that is not related to the connection characteristics data is collected 306. This long term connection characteristics, short term connection characteristics, and client data may be collected in and accessed from, for example, connection logs on servers 104 that record data for each client-server connection. Some of the data stored includes throughput of the connection, data packet loss rate, propagation delay of the client-server path, etc. In embodiments employing server farms, the long term data collector module 302 and the short term data collector module 304 may run on each individual server 104, with each server 104 recording measured data to a central location, for example at a connection characteristics database 108.

The long term data collector module 302 can measure, track and store connection data and statistics, as well as network path characteristics, for every client-server connection and client-server path. The short term data collector module 304 performs similar functions to its long term counterpart 302, but is geared toward collecting present or immediately past connection characteristics. In embodiments, the data stored in the connection characteristic database 108 can be analyzed and processed to determine an appropriate retransmission scheme for a particular client-server connection.

Connection Characteristics Data Processing

Figure 4:
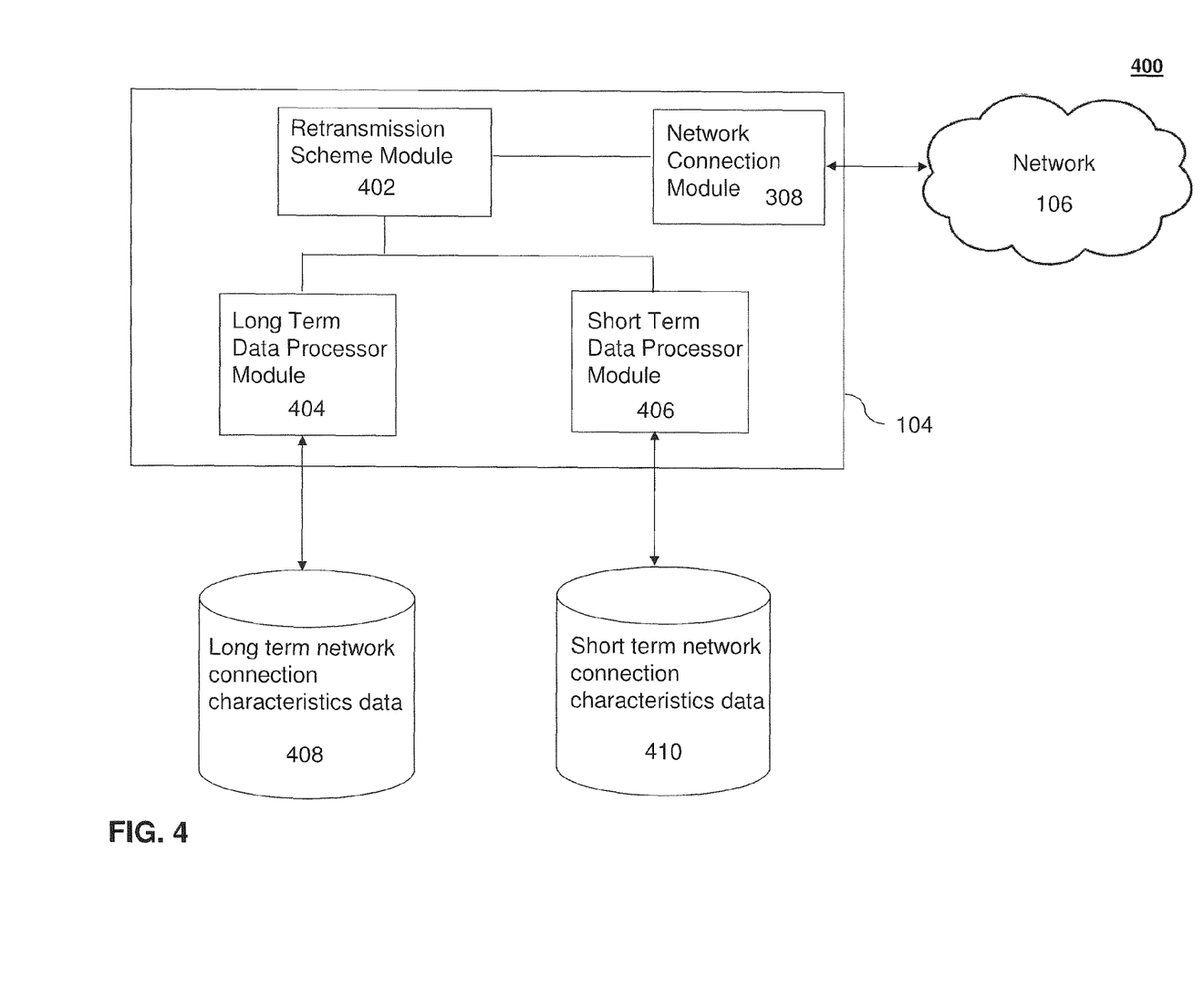
FIG. 4 illustrates a system architecture, according to an embodiment.

Turning to FIG. 4, illustrated therein is an embodiment in which long term connection characteristics data for one or more clients is stored in a database 408 and short term connection characteristics data for the one or more clients is stored in a separate database 410. A retransmission scheme module 402 can draw upon the stored data to determine an efficient retransmission scheme for a given client-server connection. An embodiment may include a long term data processor module 404 and a short term data processor module 406. The long term data processor module 404 processes all or part of the long term connection characteristics data stored in the long term connection characteristics database 408, filters noise, including outlier data, and performs various data aggregations to generate data descriptive of the historical and current connection characteristics and usable by the retransmission scheme module 402. In one embodiment, the data generated by the long term data processor module 404 may be a compact data structure that contains the useful long term connection characteristics for a particular client. In an embodiment, the retransmission scheme module 402 receives the compact data structure and assesses the useful long term connection characteristics in determining the most efficient retransmission scheme for that client.

As an example of the data processing, filtering, and/or data aggregation performed by the long term data processor module 404, the long term data processor module 404 may take as input all or part the long term connection characteristics data stored at the database 408, such as connection type, throughput or bandwidth, uptime, transmission speed, error rate, data packet loss rate, propagation delay of the connection, etc. The long term data processor module 404 may filter and clean this data by removing noisy data, such as outliers, and may aggregate certain types of data together and employ statistical techniques to generate clean and usable metrics for use by the retransmission scheme module 402. The long term data processor module 404 may also aggregate data for several client IP addresses into a single record if those clients, for example, exhibit similar connection characteristics. This is done to keep the resulting data structure provided to the long term data processor module 404 compact.

In other embodiments, large web sites often run server farms, which are collections of servers serving requests coming from clients around the world. Each server in the farm serves a subset of requests. A load balancer may sit in front of the server farm and assign or map clients to the various individual servers for handling the client requests. In one configuration, this mapping of clients to servers is based on the 4-tuple of the client IP address, client port, server IP address and server port. In such a configuration, a client may be connected to different servers for different connections it establishes. As a result, there may be variations in the measured connection characteristics that are independent of the quality and reliability of the underlying connection between the client and the server via the load balancer.

The long term data processor module 404, in one embodiment, may take these variations into account when providing useful long term connection characteristics to the retransmission scheme module 402.

The short term data processor module 406 performs similar functions as its long term counterpart, but may process current or immediately recent connection characteristics data. In an alternative embodiment, the long term data processor module 404 and the short term data processor module 406 may be combined into a single module, where this combined module receives both long term and short term data.

Determining the Retransmission Scheme

In the embodiment of FIG. 4, the retransmission scheme module 402 of the server 104 may rely on the various connection characteristics data stored in connection characteristics databases 408, 410 to determine an efficient retransmission scheme for a given client-server connection. For a given client, the retransmission scheme module 402 may assess stored long term connection characteristics data describing the reliability and quality of the underlying client connection over time. In addition, the retransmission scheme module 402 may assess stored short term connection characteristics data describing the presently or recently measured reliability and quality of the underlying client connection.

In an embodiment, the retransmission scheme module 402 receives a compact data structure from the long term data processor module 404, which describes connection characteristics over time for a particular client, and a compact data structure from the short term data processor module 406, which describes current connection characteristics for that client. Retransmission scheme module 402 uses these data structures to assess the connection characteristics data and determine the most efficient retransmission scheme for that client. When a new connection is established via the network connection module 308, the retransmission scheme module 402 causes the connection characteristics data of the given client and client-server path to be loaded into memory and uses that data to direct the retransmission scheme of the server 104 for that particular client.

For example, if long term and short term data indicate that a client is historically or currently known to have very high bandwidth, and has shown no signs of heavy data packet loss in recent history, the retransmission scheme module 402 can select an aggressive retransmission strategy. It may retransmit packets that are not acknowledged within 1.5 times the roundtrip data travel time of the channel (RTT), for example.

If, on the other hand, long term and short term data indicate that a client is historically or currently known to have low bandwidth, as with a dial-up modem connection, the retransmission scheme module may select a very conservative retransmission strategy. It may retransmit packets that are not acknowledged within 4 times the RTT, for example. In this way, duplicate data packets are not placed onto the network needlessly merely because sufficient time was not given to allow the original data packets to arrive at the recipient and the acknowledgment to make its way back to the sender.

Table 1 describes exemplary retransmission schemes for various connections based on long term and short term connection characteristics data.

TABLE 1

Exemplary Retransmission Schemes

| | Typical round trip time (RTT) | Long-term packet loss rate | Short-term packet loss rate (within last couple minutes) | Long-term bandawidth | Retransmission strategy | First retransmission timeout | Backoff strategy |
|---|---|---|---|---|---|---|---|
| Residential Broadband | 25-50 ms | 1-2% | >3% | 1-10 Mbps | aggressive | 2*RTT | exponential backoff |
| | | | <3% | | very aggressive | 1*RTT | linear backoff |
| Dialups | 500 ms-1 sec | >5% | >10% | 56 Kbps | very conservative | 4*RTT | exponential backoff |
| | | | <10% | | conservative | 3*RTT | linear backoff |
| Optical/Corporate, fast network | 10-25 ms | <1% | >3% | >10 Mbps | aggressive | 1.5*RTT | linear backoff |
| | | | <3% | | very aggressive | 1*RTT | linear backoff |

In another example, if long term and short term data indicate that a client is historically or currently known to have very high bandwidth, but has demonstrated heavy data packet loss in recent history, the retransmission scheme module 402 may select either an aggressive or conservative retransmission scheme according to preference.

Once the retransmission scheme module 402 has determined the most efficient retransmission scheme based on all or part of the available connection characteristics data for a particular client connection, the retransmission scheme module 402 instructs the TCP stack in the network connection module 308 to use that retransmission scheme for retransmitting dropped data packets over the network 106 to that client 102.

Figure 5:
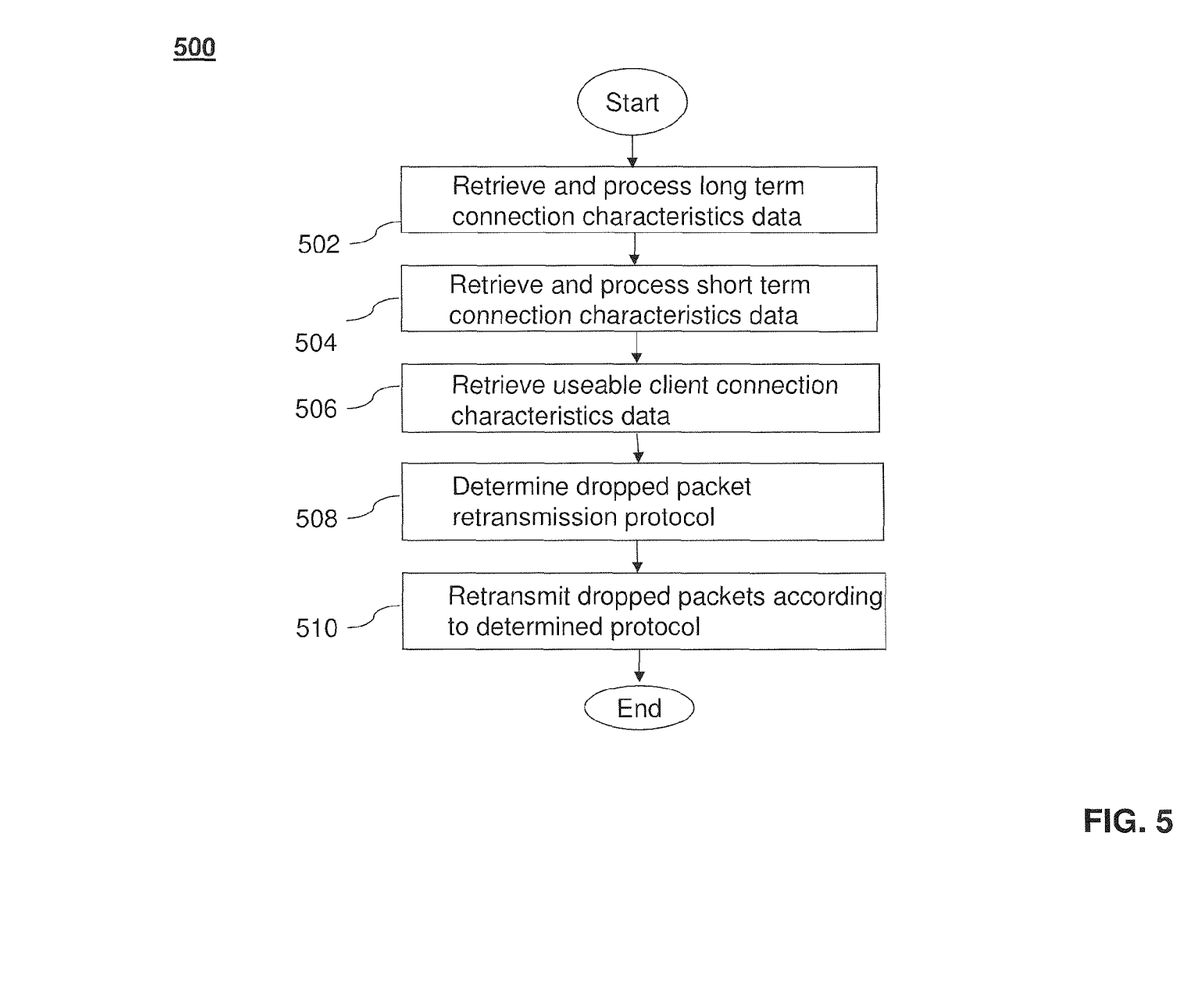
FIG. 5 is a flowchart illustrating an exemplary aspect of operation, according to an embodiment.

FIG. 5 is a flow chart illustrating exemplary operations that may be performed during retransmission scheme generation. In 502, stored long term connection characteristics data is retrieved and processed. For example, long term data processor module 404 can retrieve the data stored in long term connection characteristics database 408 and process the data to create a usable data structure for use in generating an efficient retransmission scheme. In 504, the short term connection characteristics data is retrieved and processed. For example, short term data processor module 406 can retrieve the data stored in short term connection characteristics database 410 and process the data to create a usable data structure for use in generating an efficient retransmission scheme. In 506, long term connection characteristics data and short term connection characteristics data can be provided for retransmission scheme generation. For example, retransmission scheme module 402 can receive usable client connection characteristics data from long term data processor module 404 and/or short term data processor module 406. In 508, the long term connection characteristics data and short connection characteristics data can be used to generate an efficient retransmission scheme for dropped data packets. For example, retransmission scheme module 402 can determine an efficient retransmission scheme for dropped packet data based on long term and short term connection characteristics data received from long term data processor module 404 and/or short term data processor module 406. In 510, a generated retransmission scheme can be used to retransmit dropped packet data in an efficient manner. For example, network connection module 308 can retransmit dropped packet data over network 106 according to the efficient retransmission scheme determined by retransmission scheme module 402.

Example Computer Embodiment

Figure 6:
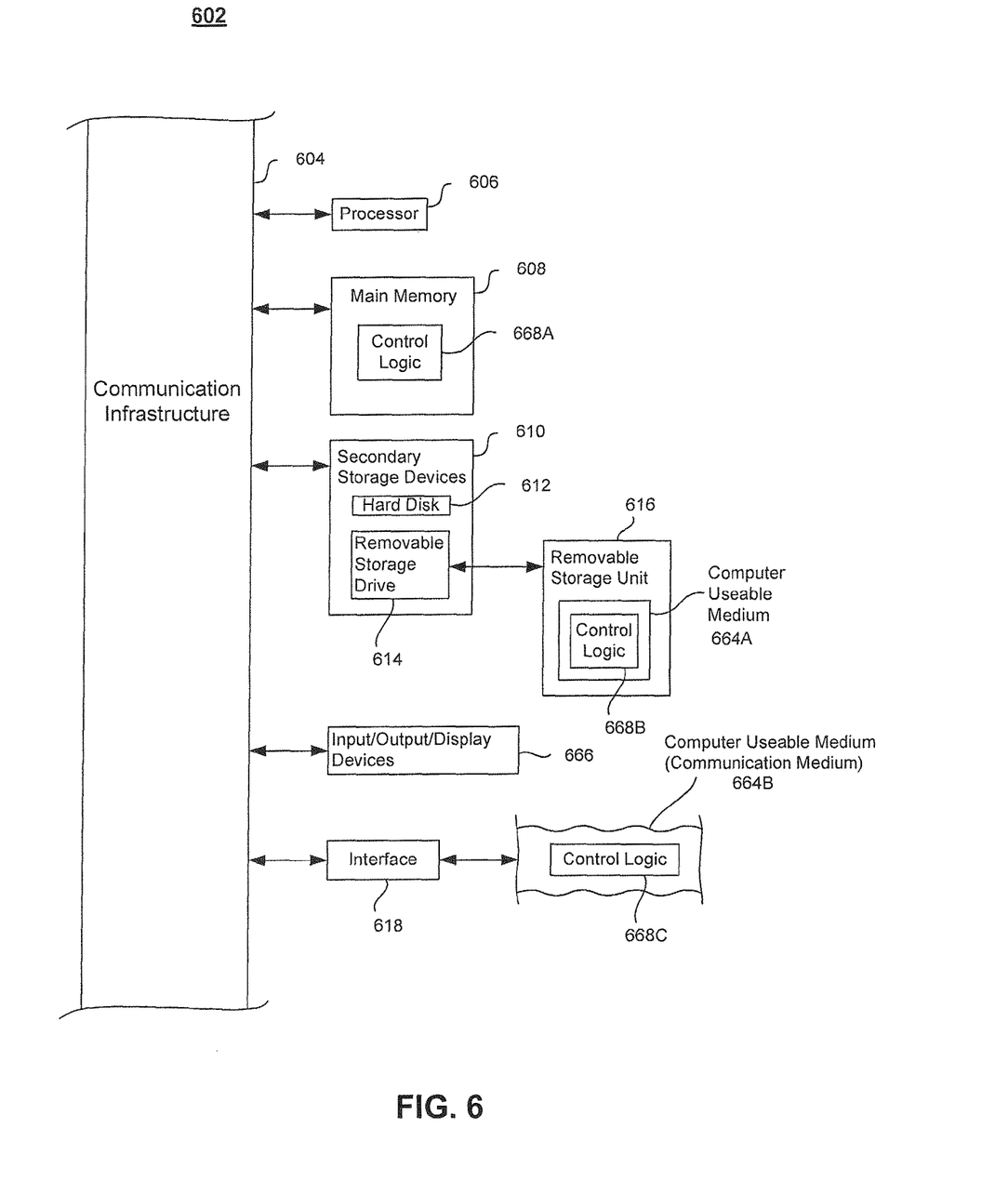
FIG. 6 illustrates an example computer useful for implementing components of the embodiments.

In an embodiment, the system and components of embodiments described herein are implemented using well known computers, such as example computer 602 shown in FIG. 6. For example, long term data collector module 302, short term data collector module 304, client data collector module 306, network connection module 308, retransmission scheme module 402, long term data processor module 404, and short term data processor module 406 can be implemented using computer(s) 602.

Computer 602 can be any commercially available and well known computer capable of performing the functions described herein, such as computers available from International Business Machines, Apple, Sun, HP, Dell, Compaq, Cray, etc. Computer 602 can also be any commercially available and well known tablet, mobile device or smart-phone capable of performing the functions described herein, such as devices available from Apple, HTC, RIM, Nokia, Sony, etc.

Computer 602 includes one or more processors (also called central processing units, or CPUs), such as a processor 606. Processor 606 is connected to a communication infrastructure 604.

Computer 602 also includes a main or primary memory 608, such as random access memory (RAM). Primary memory 608 has stored therein control logic 668A (computer software), and data.

Computer 602 also includes one or more secondary storage devices 610. Secondary storage devices 610 include, for example, a hard disk drive 612 and/or a removable storage device or drive 614, as well as other types of storage devices, such as memory cards and memory sticks. Removable storage drive 614 represents a floppy disk drive, a magnetic tape drive, a compact disk drive, an optical storage device, tape backup, etc.

Removable storage drive 614 interacts with a removable storage unit 616. Removable storage unit 616 includes a computer useable or readable storage medium 664A having stored therein computer software 668B (control logic) and/or data. Removable storage unit 616 represents a floppy disk, magnetic tape, compact disk, DVD, optical storage disk, or any other computer data storage device. Removable storage drive 614 reads from and/or writes to removable storage unit 616 in a well known manner.

Computer 602 also includes input/output/display devices 666, such as monitors, keyboards, pointing devices, Bluetooth devices, etc.

Computer 602 further includes a communication or network interface 618. Network interface 618 enables computer 602 to communicate with remote devices. For example, network interface 618 allows computer 602 to communicate over communication networks or mediums 664B (representing a form of a computer useable or readable medium), such as LANs, WANs, the Internet, etc. Network interface 618 may interface with remote sites or networks via wired or wireless connections.

Control logic 668C may be transmitted to and from computer 602 via communication medium 664B.

Any tangible apparatus or article of manufacture comprising a computer useable or readable medium having control logic (software) stored therein is referred to herein as a computer program product or program storage device. This includes, but is not limited to, computer 602, main memory 608, secondary storage devices 610 and removable storage unit 616. Such computer program products, having control logic stored therein that, when executed by one or more data processing devices, cause such data processing devices to operate as described herein, represent the embodiments.

Embodiments can work with software, hardware, and/or operating system implementations other than those described herein. Any software, hardware, and operating system implementations suitable for performing the functions described herein can be used. Embodiments are applicable to both a client and to a server or a combination of both.

CONCLUSION

It is to be appreciated that the Detailed Description section, and not the Brief Summary and Abstract sections, is intended to be used to interpret the claims. The Brief Summary and Abstract sections may set forth one or more but not all exemplary embodiments as contemplated by the inventors, and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer implemented method for retransmission of packet data over a client-server network architecture, comprising:
    (a) maintaining for a particular client in the client-server network architecture a plurality of long term network connection characteristics that describe characteristics of a plurality of previous network connections between the particular client and a server, wherein the plurality of previous network connections comprise network connections where data is transferred between the particular client and the server, other than a current network connection,
    wherein the maintaining includes storing to a database the plurality of long term network connection characteristics for the particular client and client specific data not related to connection characteristics;
    (b) determining for the particular client in the client-server network architecture an efficient retransmission scheme for retransmitting packet data based on the plurality of long term network connection characteristics maintained for the particular client; and
    (c) retransmitting packet data to the particular client according to the particular client's determined efficient retransmission scheme.

2. The method of claim 1, wherein the plurality of long term network connection characteristics comprise measured connection characteristics of the plurality of previous network connections between the particular client and the server.

3. The method of claim 1, wherein each of the plurality of long term network connection characteristics describes at least one of round trip data travel time of a packet, connection type between the particular client and the server, throughput of data between the particular client and the server, bandwidth between the particular client and the server, uptime of the particular client and the server, transmission speed available to the client, data packet loss rate between the particular client and the server, propagation delay of a data packet, or error rate of a particular previous packet data transmission between the particular client and the server.

4. The method of claim 1 further comprising:
    (d) maintaining for the particular client in the client-server network architecture one or more short term network connection characteristics that describe a current or an immediately preceding network connection between the particular client and the server, and
    wherein step (b) comprises determining for the particular client in the client-server network architecture an efficient retransmission scheme for retransmitting packet data based on the plurality of long term network connection characteristics maintained for the particular client and the one or more short term network connection characteristics maintained for the particular client.

5. The method of claim 4, wherein step (d) comprises storing to a database the one or more short term network connection characteristics.

6. The method of claim 4, wherein the one or more short term network connection characteristics comprise one or more measured connection characteristics for a present connection between the particular client and the server.

7. The method of claim 4, wherein the one or more short term network connection characteristics is at least one of round trip data travel time, connection type, throughput, bandwidth, uptime, transmission speed, data packet loss rate, propagation delay, or error rate of a present connection between the client and the server.

8. A computer-based system for retransmission of packet data over a client-server network architecture, comprising:
one or more processors;
a repository configured to maintain for a particular client in the client-server network architecture a plurality of long term network connection characteristics that describe characteristics of a plurality of previous network connections between the particular client and a server, wherein the plurality of previous network connections comprise network connections, other than a current network connection where data is transferred between the particular client and the server,
wherein the repository is further configured to store to a database the plurality of long term network connection characteristics for the particular client and client specific data not related to connection characteristics;
a retransmission scheme module configured to determine for the particular client in the client-server network architecture an efficient retransmission scheme for retransmitting packet data based on the plurality of long term network connection characteristics maintained for the particular client; and
a network connection module configured to retransmit packet data to the particular client according to the particular client's determined efficient retransmission scheme.

9. The system of claim 8, wherein the plurality of one or more long term network connection characteristics comprise measured connection characteristics of previous for at least cine previous network connections between the client and the server.

10. The system of claim 8, wherein each of the plurality of long term network connection characteristics describes at least one of round trip data travel time of a packet, connection type between the particular client and the server, throughput of data between the particular client and the server, bandwidth between the particular client and the server, uptime of the particular client and the server, transmission speed available to the client, data packet loss rate between the particular client and the server, propagation delay of a data packet, or error rate of a particular previous packet data transmission between the particular client and the server.

11. The system of claim 8 wherein:
the repository is configured to maintain for the particular client in the client-server network architecture one or more short term network connection characteristics that describe a current or an immediately preceding network connection between the particular client and the server; and
wherein the retransmission scheme module is configured to determine for the particular client in the client-server network architecture an efficient retransmission scheme for retransmitting packet data based on the plurality of long term network connection characteristics maintained for the particular client and the one or more short term network connection characteristics maintained for the particular client.

12. The system of claim 11, wherein the one or more short term network connection characteristics comprise one or more measured connection characteristics for a present connection between the particular client and the server.

13. An article of manufacture including a tangible, non-transitory computer-readable medium having instructions stored thereon that, when executed by a processing device, cause said processing device to perform operations comprising:
(a) maintaining for a particular client in the client-server network architecture a plurality of long term network connection characteristics that describe characteristics of a plurality of previous network connections between the particular client and a server, wherein the plurality of previous network connections comprise network connections, other than a current network connection where data is transferred between the particular client and the server,
wherein the maintaining includes storing to a database the plurality of long term network connection characteristics for the particular client and client specific data not related to connection characteristics;
(b) determining for the particular client in the client-server network architecture an efficient retransmission scheme for retransmitting packet data based on the plurality of long term network connection characteristics maintained for the particular client; and
(c) retransmitting packet data to the particular client according to the particular client's determined efficient retransmission scheme.

14. The article of manufacture of claim 13, wherein the plurality of long term network connection characteristics comprise one or more measured connection characteristics of previous network connections between the particular client and the server.

15. The article of manufacture of claim 13, wherein each of the plurality of long term network connection characteristics describes at least one of round trip data travel time of a packet, connection type between the particular client and the server, throughput of data between the particular client and the server, bandwidth between the particular client and the server, uptime of the particular client and the server, transmission speed available to the client, data packet loss rate between the particular client and the server, propagation delay of a data packet, or error rate of a particular previous packet data transmission between the particular client and the server.

16. The article of manufacture of claim 13 further comprising:
(d) maintaining for the particular client in the client-server network architecture one or more short term network connection characteristics that describe a current or an immediately preceding a network connection between the particular client and the server; and
wherein the determining for the particular client in the client-server network architecture an efficient retransmission scheme for retransmitting packet data based on the plurality of long term network connection characteristics maintained for the client further comprises determining for the particular client in the client-server network architecture an efficient retransmission scheme for retransmitting packet data based on the one or more short term network connection characteristics maintained for the particular client.

17. The article of manufacture of claim 16, wherein the one or more short term network connection characteristics comprise one or more measured connection characteristics for a present connection between the particular client and the server.

\* \* \* \* \*